United States Patent [19]

Matsunawa

[11] Patent Number: 4,578,712
[45] Date of Patent: Mar. 25, 1986

[54] PICTURE IMAGE DISCRIMINATING APPARATUS

[75] Inventor: Masahiko Matsunawa, Hachioji, Japan

[73] Assignee: Konishiroku Photo Industry Co., Ltd., Tokyo, Japan

[21] Appl. No.: 449,385

[22] Filed: Dec. 13, 1982

[30] Foreign Application Priority Data

Dec. 19, 1981 [JP] Japan .................................. 205520
Dec. 25, 1981 [JP] Japan .............................. 56-212471
Dec. 25, 1981 [JP] Japan .............................. 56-212472
Dec. 25, 1981 [JP] Japan .............................. 56-212473
Dec. 28, 1981 [JP] Japan .............................. 56-213828
Dec. 28, 1981 [JP] Japan .............................. 56-213830

[51] Int. Cl.$^4$ .............................................. H04N 1/40
[52] U.S. Cl. .................................... 358/282; 358/283; 382/51
[58] Field of Search .................... 355/8; 358/93, 280, 358/288, 284, 282, 283; 382/51, 18

[56] References Cited

U.S. PATENT DOCUMENTS

| 3,965,290 | 6/1976 | Tisue | 358/280 |
| 4,189,744 | 2/1980 | Stern | 358/93 |
| 4,196,454 | 4/1980 | Warren | 358/284 |
| 4,447,830 | 5/1984 | Stoffel | 358/288 |
| 4,468,703 | 8/1984 | Fujiwara et al. | 382/51 |

Primary Examiner—Edward L. Coles, Sr.
Attorney, Agent, or Firm—James E. Nilles; Thomas F. Kirby

[57] ABSTRACT

A picture image discriminating apparatus operating for picture image discrimination processing by scanning a document, converting a light signal corresponding to every unit reading sizes 0.01 mm$^2$ or over of the document photoelectrically and transmitting it to a signal processing division that a density signal of the picture image of document. The document is divided into a plurality of blocks, and the density signal of the picture image of document is processed at every blocks, thereby discriminating picture images. The density signal of the picture image of document is processed to obtain an effective density histogram, and a cumulative value of the density signals over or below a specific density threshold is obtained in the histogram, thereby discriminating picture images.

12 Claims, 39 Drawing Figures

F I G. 10 (a)
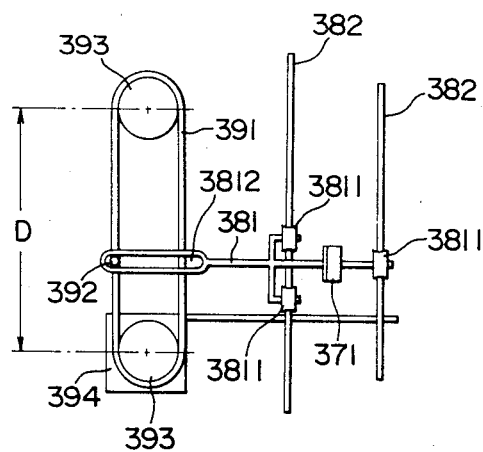
F I G. 10 (b)
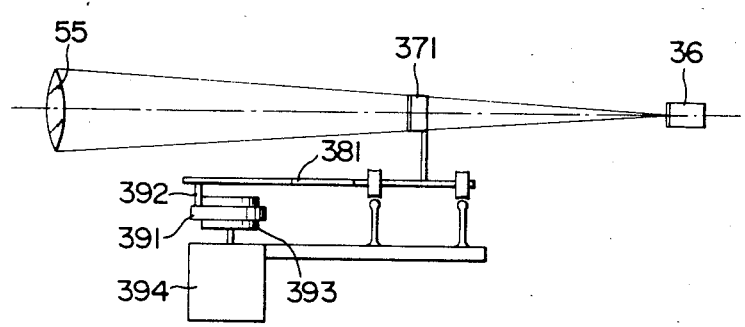

$\longleftarrow 1/3\,\phi_x \longrightarrow$

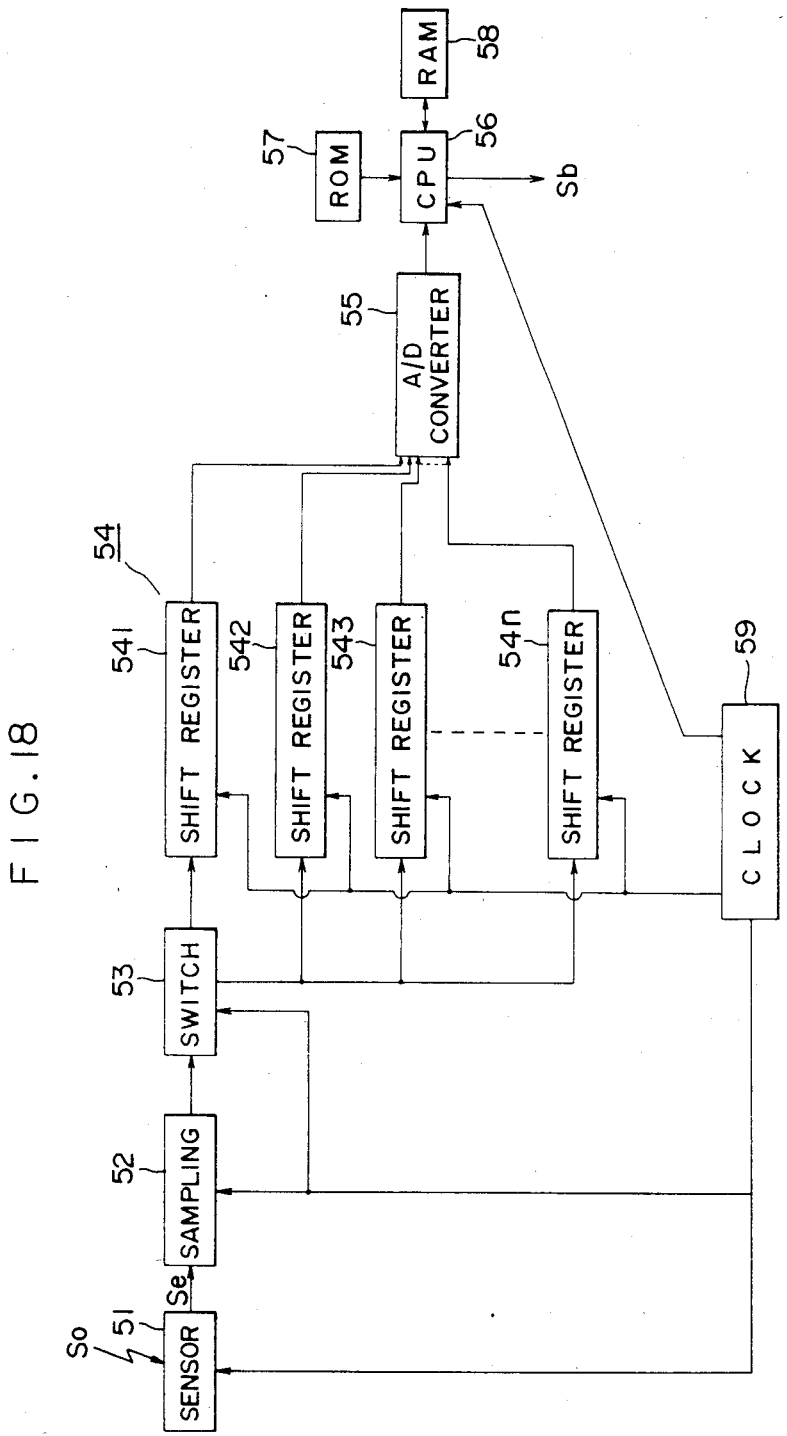

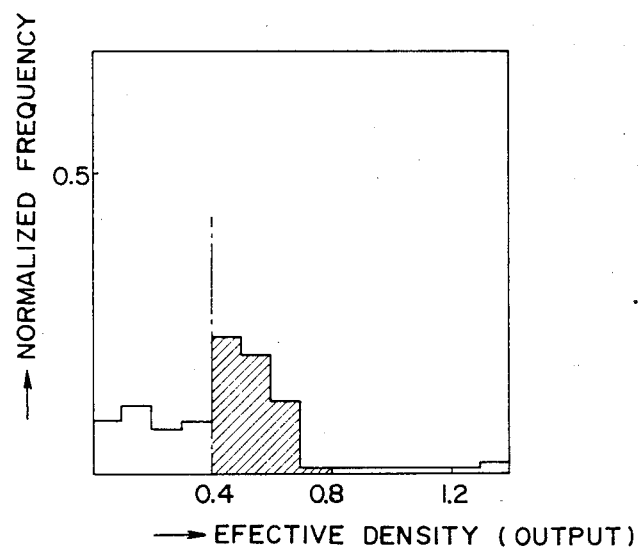
F I G. 20 (b)
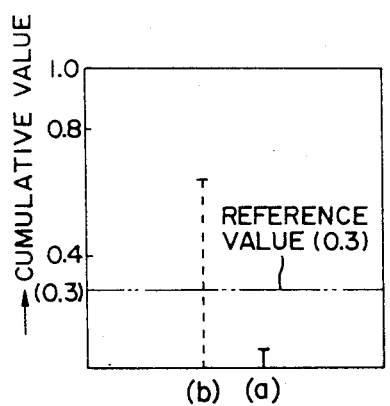
F I G. 20 (c)

PICTURE IMAGE DISCRIMINATING APPARATUS

BACKGROUND OF THE INVENTION

1. Field of the Invention

This invention relates to a picture image discriminating apparatus for discriminating the classification of a picture image of document, i.e. a linear picture with a linear picture image as principal constituent, a tonal picture having a tone, or a hybrid picture for which the linear picture and the tonal picture are mixed by means of a picture image density information obtainable through scanning the picture image of document.

2. Description of the Prior Art

A copying technique has been so improved of late that a copy of satisfactory picture quality is obtainable from a document consisting only of a linear picture or a tonal picture. Namely, a decision of the linear picture and tonal picture is made by visual observation, an operating button to specify processing conditions for the linear picture or tonal picture is prepared independently, an operator will select a suitable operating button as the result of visual observation, thereby obtaining a copy. Therefore, there may be a case where an erroneous decision or operation leads to a wasteful copying.

Further, the situation is such that a copy will have to be obtained as fast as possible and also as efficiently as possible, and a copying machine provided with an automatic document feed motion (ADF) has rapidly been prevailing today, therefore the above-mentioned picture image discriminating operation by visual observation is not to cope with the object referred to as above, and such operation cannot be applied practically on the copying machine provided particularly with ADF motion.

On the other hand, when a picture image data is compressed to transmission or store like facsimile and picture image data base, information compression efficiency is not secured unless a coding suitable for each linear picture and tonal picture is applied, and hence a picture image discriminating apparatus superior in performance has been required.

There is given hitherto a picture image discriminating method (patent application Ser. No. 120623/1980) which comprises the steps of scanning a document, forming a histogram according to a density distribution of each spot of the document, and thus discriminating picture images from a pattern of the histogram, however, while effective chiefly to a linear picture information, it involves a hardship for application on a tonal picture.

Namely, a unit reading size (scanning spot) for the image discrimination is very small as in the case of picture image pickup, therefore the method is superior to pickup dimension and tone of the line for linear picture, however, tone of a detail and dot or stain of a meshy picture are picked up for a tonal picture, which may lead sometimes to an erroneous discrimination, and the method is next to incompetent for a hybrid picture.

SUMMARY OF THE INVENTION

In view of the increasing requirements for high speed operation, better efficiency and higher picture quality on recording apparatuses including a copying machine as mentioned, an object of this invention is to provide a picture image discriminating apparatus which is capable definitely of discriminating picture images of linear picture, tonal picture and hybrid picture.

The above object of the invention can be attained then by processing a density signal of the picture image of document which is obtained through a photoelectric conversion of the picture image of document at every unit reading sizes at 0.01 mm$^2$ or over on a picture image discriminating apparatus operating for picture image discrimination by scanning a document, transmitting a light signal corresponding to a picture image density of the document to a signal processing division through photoelectric conversion, thereby discriminating the picture image.

Then, the above-mentioned object of this invention can also be attained by a picture image discriminating apparatus provided on a scanning unit having a photoelectric conversion element scanning a document almost overall, receiving an optical image corresponding to a picture image of the document and outputting an electric signal corresponding to the picture image density, and scanning the document in the subscanning direction as moving the photoelectric conversion element in the main scanning direction.

Another object of this invention is to provide a picture image discriminating apparatus definite in discrimination of linear picture and tonal picture, simple in configuration of a signal processing circuit for picture image discrimination to require no wide space exclusively for installation, and available for additional installation.

The object of this invention described above can be attained by a picture image discriminating apparatus provided with a light receiving face of the photoelectric conversion element in an approximate focus domain near the focus whereat a document is imaged by a pickup lens, processing an output signal of the photoelectric conversion element corresponding to the quantity of light incident at each scanning spot through the pickup lens on the light receiving face, thereby discriminating the kind of the picture image of a document.

In view of a necessity of high compression efficiency in a coding compression store of a document picture, further object of this invention is to provide a picture image discriminating apparatus high in precision and reliability for function of discriminating the picture image.

The above further object of the invention can be attained by a picture image discriminating apparatus to operate for discriminating a document picture through processing a picture signal formed correspondingly to the light signal obtained through scanning a document, which is characterized in that the light signal to store in a picture element is increased for the photoelectric conversion element with a light constituted so that an output timing of the picture signal at every main scanning lines of the photoelectric conversion element to scan the document is adjustable.

Then, further object of this invention is to provide a picture image discriminating apparatus operating for discrimination of a quality of the picture image of document beforehand so as to obtain a satisfactory copy picture quality or efficient signal compression at the time of copying a document consisting of a picture in which linear picture, tonal picture or both are mixed at an arbitrary ratio or at the time of coding compression store.

The above further object of this invention can be attained by a picture image discriminating apparatus which operates for scanning with a solid state image sensor a document and transmitting a picture signal thus obtained to a signal processing division for discrimination of a picture image of the document, which is characterized in that the picture signal is obtained at every unit picture image reading sizes having a domain at $4a^2$ or over, where "a" is a minimum reading width of the solid state image sensor.

Then, the above further object can be attained by a picture image discriminating apparatus which operates for forming a picture signal according to the light signal obtainable through scanning a document with a solid state image sensor, processing the picture signal to a discrimination of a picture image of the document, which is characterized in that a scan moving speed of the solid state image sensor is constituted to be adjustable to the document, and thus irradiation of the light signal per unit time to each picture element of the solid state image sensor is controlled to a discrimination of a picture image of the document.

Other objects and features of the invention will be clarified according to the following description of the drawings.

BRIEF DESCRIPTION OF THE DRAWINGS

FIG. 10(a) and FIG. 10(b) are plan view and side view representing one operative example of a scanning unit relating to this invention which operates zigzag scanning of FIG. 9(a);

FIG. 18 is a block diagram representing one example of a signal processing division in the picture image discriminating apparatus according to this invention;

DESCRIPTION OF THE PREFERRED EMBODIMENTS

The invention will now be described for operative examples.

From scanning a picture image of document with a small area of unit reading size (called "spot" hereinafter), a time series pattern of effective density of a light signal for the picture image density becomes such that one or small number of high density signals are scattered in the majority of low density signals in the case of linear picture, but a pattern in which a high, medium or low density signal is distributed comparatively in series is given in the case of tonal picture.

On the other hand, the time series pattern of an effective density of the light signal for picture image density obtainable through widening the spot area somehow has the high density signal suddenly decreased in the case of linear picture as compared with the case where the picture image of document is scanned to reading at every spots of small area as described. Then, in the case of tonal picture, a change is given not so sharply. A difference in an effective density histogram distribution due to dimensions of the spot, or document scanning unit is described concretely below.

Figure 1:
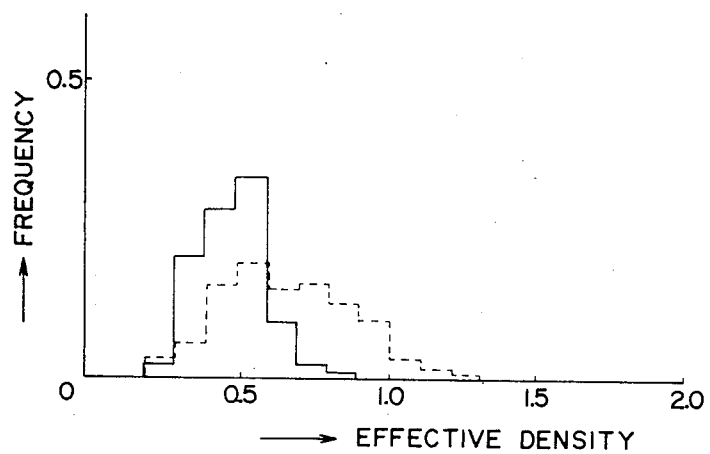
FIG. 1 and FIG. 2(a) are histograms obtained on a spot 0.1 m square and 2 mm diametral, illustrating a constitution of an apparatus according to this invention.
Figure 2A:
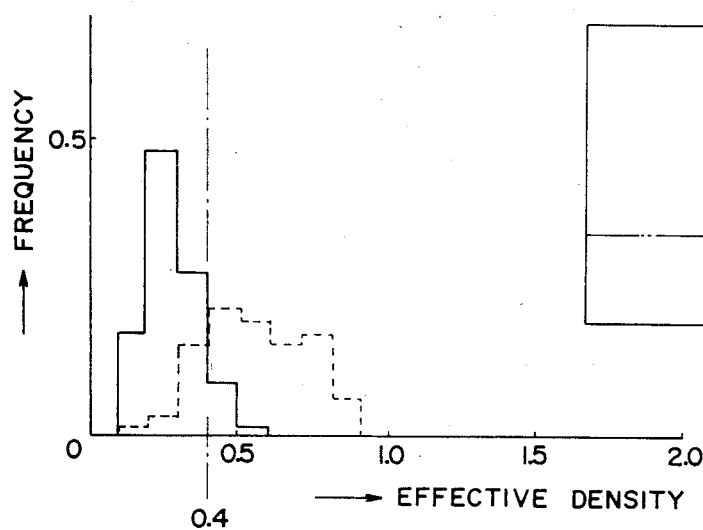

Histograms obtained through scanning the character picture image division and photographic picture image division of a newspaper with a unit reading size (spot) 0.1 mm square (0.01 mm$^2$) and a spot 2 mm diametral (3.14 mm$^2$) at regular intervals of 1 mm are shown in FIG. 1 and FIG. 2(a) respectively. In the drawings, the histogram indicated by a continuous line is obtained from the character picture image division, and that of being indicated by broken line is obtained from the photographic picture image division. As will be apparent from comparing the two drawings, the maximum peak of the histogram by spot 2 mm diametral is deflected sharply to a low density side as compared with the maximum peak of spot 0.1 mm square in the linear picture (character picture image division). On the other hand, a deflection is not so appreciable in the tonal picture (photographic picture image division). The situation does not so change from changing the scanning interval to 0.3, 0.9, 1.0 or 1.5 mm, and hence it has been caused by the unit reading size. Then, a density section of the histograms can be taken arbitrarily, and the deflection phenomenon of the maximum peak can be observed likewise. In FIG. 1 and FIG. 2(a), a density 0.1 is used for the density section.

A deflection of the maximum peak density position in a histogram of the linear picture in the direction of a low density depends on a size of the unit reading for document and fluctuates according to the picture image, however, it is remarkable statistically when the spot size is 0.01 mm$^2$ or over.

Then, the histogram obtained through enlarging the spot further will be given as one column most simple and one in frequency including a mean density of the picture image in the density section. Namely, it is given as a graph showing the very mean density value of the picture image.

Next, a process to discriminate the picture image by means of the histogram shown in FIG. 2(a) which is obtained with a spot, for example, 2 mm diametral will be described as follows.

In FIG. 2(a), a reference value (density threshold) which distributes the linear picture and the tonal picture can be specified. An effective density value 0.4 indicated by a one-dot chain line is specified in FIG. 2(a). It is apparent that the density threshold may change according to dimensions of unit reading size (spot).

Figure 2B:
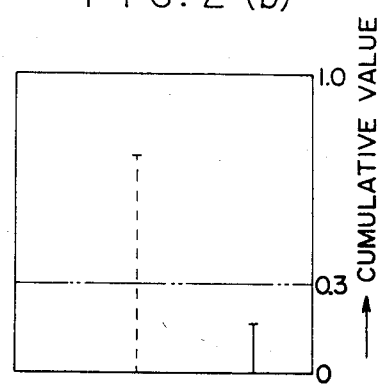
FIG. 2(b) is a cumulative histogram obtainable from the histogram of FIG. 2(a)

Next, either high density side or low density side from the density value is taken up, and a cumulative value of the density frequency of both the linear picture and tonal picture on the side thus taken up is obtained. FIG. 2(b) is a histogram in which the cumulative value is obtained with the high density side taken up therefor. The axis of ordinates in FIG. 2(b) gives the cumulative value when a total number of picture image sampling times (total number of scanning points) is specified at 1 for preparing the histogram. As will be apparent from the drawing, the peak of frequency of the histogram has been deflected almost to the low density side in the linear picture, therefore the cumulative value is minimized and the cumulative value of the tonal picture is large on the other hand, therefore values of both the two are isolated without confusion statistically.

The above may lead to a feasibility of outputting a discriminating signal of the picture image in a binary-coded form of whether the cumulative value is greater or less than the discrimination threshold value from specifying the threshold value for discriminating the picture image in the middle of both cumulative values of the histograms. A cumulative value 0.3 indicated by a two-dot chain line is specified as the threshold in FIG. 2(b).

Then, the threshold for picture image discrimination can also be specified likewise from obtaining the cumulative value for the low density side, therefore a discriminated result of the picture image can be extracted as a binary-coded signal.

Next, a picture image discriminating apparatus according to this invention will be described with reference to one operative example given in FIG. 3.

In the drawing, 31 denotes a document, and 32 denotes a transparent document plate, which reciprocates in the direction indicated by an arrow. Further, 33 denotes a light source, for which tungsten filament lamp, sodium vapor lamp, fluorescent lamp, iodine lamp, laser light source, LED, etc. can be used.

Then, 34 denotes a mirror, which irradiates a reflection from the document to a condensing lens 35, and 36 denotes a photoelectric conversion element (called "sensor" hereinafter).

For the sensor 36, a solid state image sensor including DDC, or photoelectric conversion elements of phototransistor, photodiode, Cds cell or that of array form thereof and scannister can be used. When the condensing lens 35 is used like this operative example, the sensor 36 is provided in a passage of luminous flux of the reflection from the document 31 which is focused by the condensing lens 35. The position is not necessarily limited to the focus of the condensing lens 35 to the document surface. To say concretely, when an optical image of the document is scanned and read with the areea of a unit reading size (spot) on the document surface taken at 0.01 mm$^2$ or over or preferably at 1 to 4 mm$^2$ or so, a mask provided with slit or pinhole is placed before each sensor to regulate the size of an incident light, an element with suitable area per picture element is used for CCD image sensor, an optical system is adjusted, or a position to install the sensor is adjusted.

Then, 37 denotes a signal processing division to carry out various processings for the picture image discrimination upon inputting a picture signal Se for which a light signal So corresponding to the picture image of document becomes an electrical output through photoelectric conversion by the sensor 36.

In the picture image discriminating apparatus according to this invention, a wavelength of the incident light on the sensor can be controlled by means of a color filter to sort the light wavelength according to color conditions of the document like a color of the document material or a color of the picture image and wavelength spectral conditions of the light from a light source, or a prism capable of separating the wavelength freely through selecting angles. Further, a filter cutting infrared rays can be used at the same time.

Then, discrimination is carried out by means of a reflection from the document in this operative example, however, it goes without saying that a light transmitted through the document can also be used.

Figure 4:
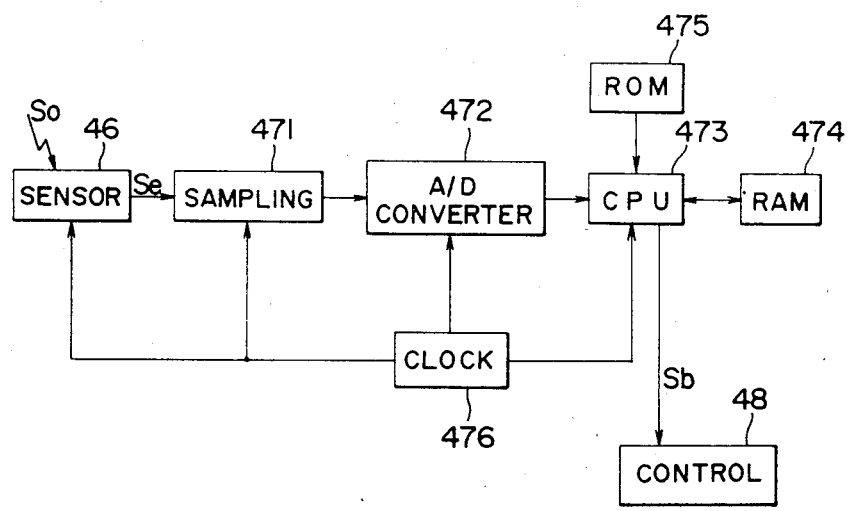
FIG. 4 is a block diagram of a signal processing division of the apparatus according to the invention.

FIG. 4 is a block diagram of one operative example of a signal processing division in the picture image discriminating apparatus according to this invention.

In the drawing, 46 denotes a sensor for converting the incident light signal So into the electrical picture signal Se, 471 denotes a sampling circuit for the picture signal Se, 472 denotes an A/D converter for converting an analog signal from the sampling circuit 471 into a digital signal, 473 denotes a central processing unit (CPU) of microprocessor and others on which arithmetic operation and decision of a data statistics, conversion, etc. are carried out, 474 denotes a memory (RAM) for recording and storing data from CPU 473 and further supplying the recorded data to CPU 473, and 475 denotes a memory (ROM) for storing programs for operation of CPU 473 and others.

Then, 476 denotes a reference clock generating division for producing a pulse to control a light receiving time of the sensor 46, a clock signal to determine an operating timing of the sampling circuit 471 and the A/D converter 472, a clock signal to determine a timing of operation of CPU 473 and data sending or calling, and others.

Further, 48 denotes a control unit on a recording apparatus which operates for control of recording conditions upon receiving a picture image discriminating signal Sb from CPU 473.

Figure 5:
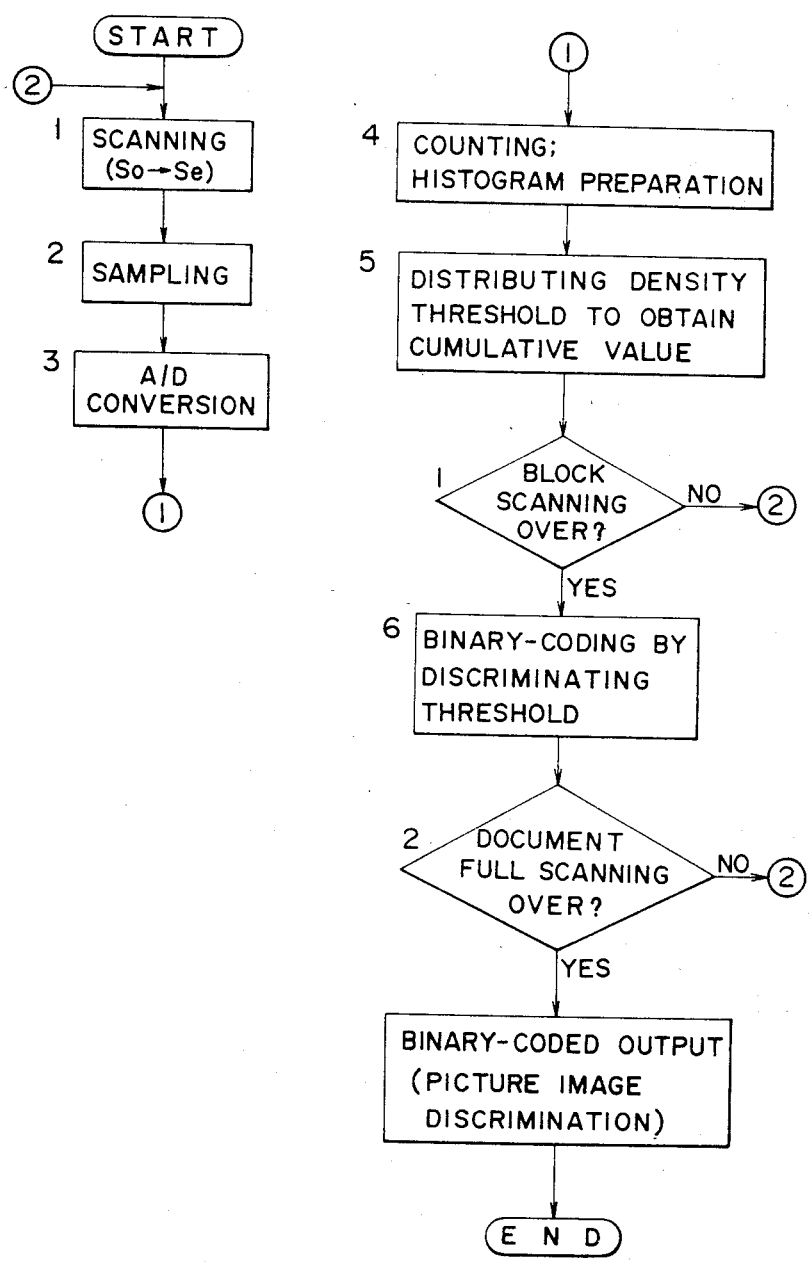
FIG. 5 is a flowchart of working process of this invention.

Next, a flowchart for operation at the signal processing division is shown in FIG. 5.

The light signal So is converted photoelectrically into the electrical picture signal Se at every spots 0.01 mm$^2$ large or over by Processing 1, and the picture signal Se is sampled by Processing 2. The picture signal Se of analog value is subjected to A/D conversion by Processing 3, and the digitized picture signal Se is counted and made into a histogram by Processing 4. The histogram thus made out is distributed to a high density side or a low density side by Processing 5 according to the threshold for picture image density, for example, at 0.4, and a cumulative value is obtained with reference to either one side. Here, for a hybrid picture of linear picture and tonal picture, for which the picture image is discriminated at each block so divided into m × n pieces instead of the document as a whole, a decision on whether or not the scanning of the block under processing currently ends is carried out (Decision 1) by counting reference blocks, and if "NO", the scanning is recommenced from Processing 1, but if "YES", then the block is discriminated for linear picture or tonal picture according to a discriminating threshold (0.3 for example) by Processing 6. Then, whether or not the scanning ends for the whole document or all blocks concerned is asked (Decision 2), and if "NOT", the scanning is recommenced from Processing 1, but if "YES", then a picture image discriminated result binary-coded at each block is outputted by Processing 7.

In processing and decision performed by CPU, the sequence of Processing 5 and Decision 1, and Processing 6 and Decision 2 can be replaced. Further, Decisions 1 and 2 can be continued to Processing 4, and after Decisions are over, Processing 5, 6 and 7 can be continued. The sequence for these processings and decisions will be given to the memory ROM beforehand.

Next, examples of having discriminated various picture images of document on the picture image discriminating apparatus according to this invention are shown in FIG. 6(a) to FIG. 6(d).

FIG. 6 is a histogram obtained with a density section at 0.1 through scanning the picture image of document by means of a spot 2 mm diametral.

Figure 6A:
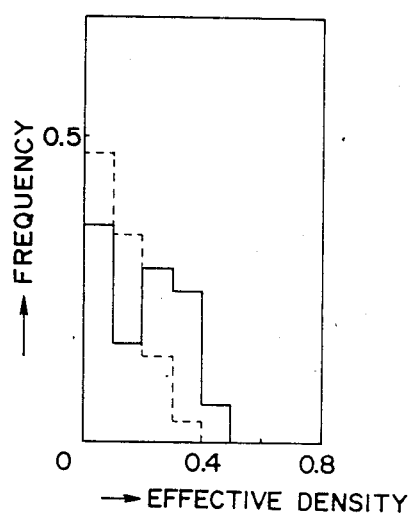
FIG. 6(a), FIG. 6(b), FIG. 6(c) and FIG. 6(d) are histograms of each picture image obtained from using the invention.

FIG. 6(a) represents a character picture image, wherein the continuous line indicates a picture character with many strokes, and the dotted line indicates a picture character with less strokes. FIG. 6(b) gives an example of weather chart, wherein both continuous and dotted lines indicate a sampling with the latitude changed occasionally. Both come in a linear picture as picture image.

Figure 6C:
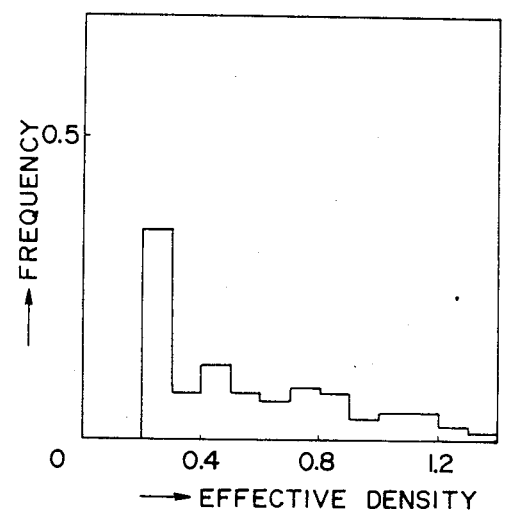
Figure 6B:
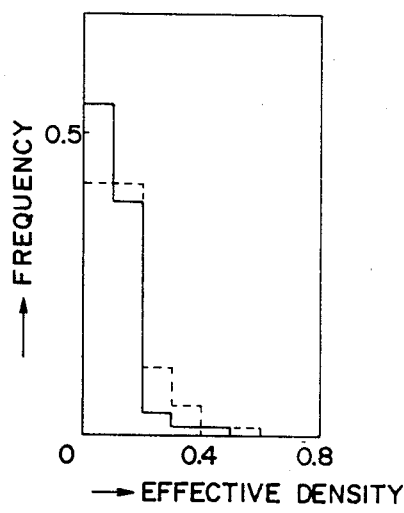
Figure 6D:
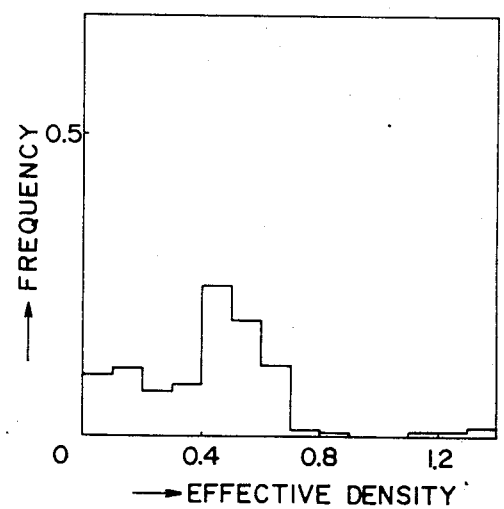

Further, a human bust picture and a landscape are selected as tonal picture in FIG. 6(c) and FIG. 6(d) respectively, and a histogram is obtained for each of them.

These four sheets of document are given in one sheet, which is divided into blocks 2×2 to scanning, and the picture image is discriminated at each block.

Figure 7:
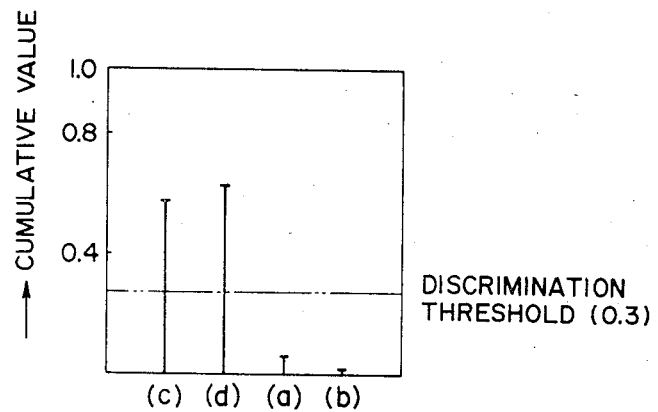
FIG. 7 is a cumulative histogram obtainable from the histograms.

From obtaining cumulative values of density frequency coming on a high density side from the density threshold working as reference value for the threshold at 0.4 in density at each histogram, a histogram of cumulative values (a), (b), (c) and (d) which correspond to histograms in FIGS. 6(a), (b), (c) and (d) respectively is obtained in FIG. 7.

When the cumulative value 0.3 is taken as a discrimination threshold, it comes lower than the threshold for (a) and (b) but higher for (c) and (d), thus discriminating the picture image definitely as linear picture for (a) and (b) and tonal picture for (c) and (d) in FIG. 7.

As described above, the picture image discriminating apparatus of this invention is satisfactory enough to attain objects of this invention through satisfying the requirements for high speed operation, better efficiency and higher picture quality of the recording apparatus, and realizing a definite discrimination of the picture image. Then, in this operative example, a decision is made by means of blocks 2×2, however, it is apparent that the size is not necessarily absolute to comply with. It is further apparent that nothing should be arranged to a fixed block.

Figure 8A:
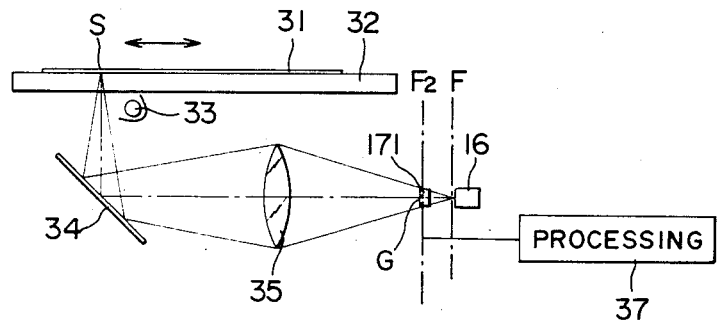
FIG. 8(a) and FIG. 8(b) are schematic drawings of a pickup system in which a picture image discriminating apparatus in other operative example of this invention is installed.

FIG. 8(a) represents another example of a picture image reading apparatus for which the picture image discriminating apparatus according to this invention is applied, indicating an outline of the pickup system to subject a light signal of the picture image of document to a photoelectric conversion with a solid state image sensor and then transmit it or output to a recording system. In FIG. 8(a), like reference numerals refer to like parts in FIG. 3. In the drawing, the direction in which the transparent document plate reciprocating in the direction indicated by an arrow moves is fixed to be that for subscanning. A reference numeral 16 denotes a solid state image sensor of CCD or the like having its light receiving face provided correctly on a focus F at imaging side of the pickup lens 35, which is an image sensor having a picture element line rectangularly to the paper face of the drawing, in this case.

In the above-mentioned pickup system, the light receiving face of a photoelectric conversion element (called "sensor" hereinafter) 171 for picture image discrimination is provided at a point G on an approximate focus F$_2$ of the pickup lens 35 in the luminous flux of a light emitted from a small area S of the document 31 which is focused by the pickup lens 35 and imaged on the focus F. Here, the approximate focus refers to a face within the domain in the neighborhood of the focus, and the sensor 171 can be provided on the focus.

The sensor 171 is provided at the point G in such manner as will move freely in the main scanning direction (direction vertical to the paper face in the drawing). Then, a light source for illuminating the document applied for picture image discrimination on the picture image discriminating apparatus of this invention and a lens for focusing the light from the document are substituted with the light source 33 and the pickup lens 35 of the pickup system.

Figure 8B:
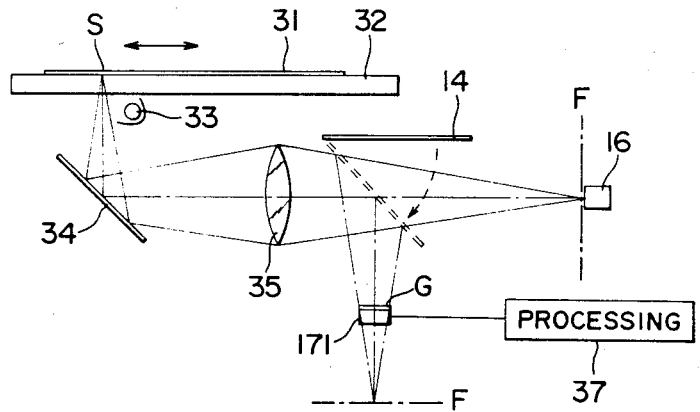

There is shown an example of the pickup system and the sensor 171 for picture image discrimination according to this invention in FIG. 8(b), a mirror 14 can be inserted in an optical path on the imaging side of the pickup lens 35, and the mirror 14 moves to a position indicated by broken line in the drawing only when a density information for picture image discrimination is applied to the sensor 171. The mirror 14 can be constituted of a half mirror, which will be fixed on a position indicated by broken line.

The sensor 171 can be provided on the focus F or in the approximate focus domain G. A tone of the picture image is smoothed by providing the light receiving face of the sensor 171 at the approximate focus domain G and thus an output of the sensor 171 can be used as a mean value of the picture density incident nearly on the light receiving face, therefore an average circuit for density is not required and a processing circuit is simplified in configuration.

Figure 9:
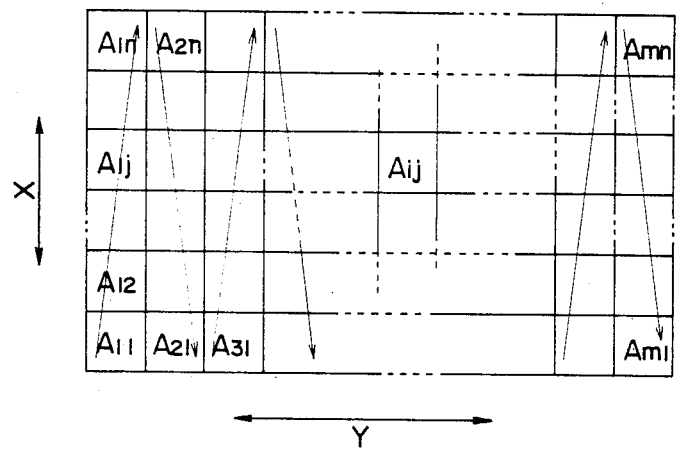
FIG. 9(a) and FIG. 9(b) represent two examples of the scanning pattern of a sensor relating to the invention.
Figure 9:
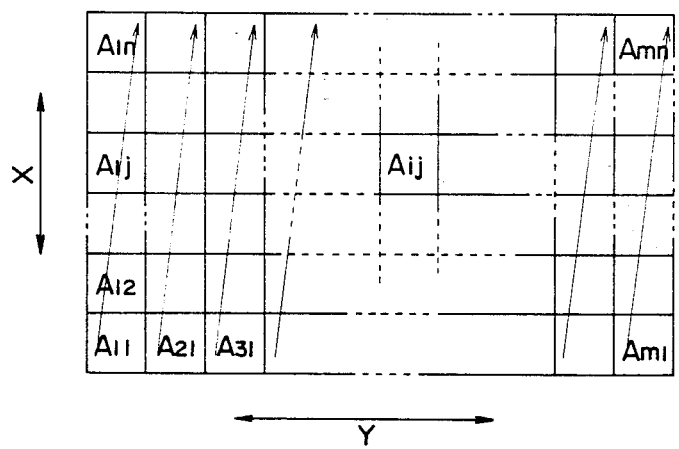

In the picture image discrimination according to this operative example, the document is divided into a plurality of blocks by dividing the document for the main scanning direction and also for the subscanning direction, the document is scanned overall by the sensor 171 as shown in the line indicated by arrow in FIG. 9(a) and FIG. 9(b), and an output into which the light signal corresponding to the picture image of document is converted photoelectrically according to the scanning is obtainable, therefore the document surface is divided into blocks A11-Amn as shown in FIG. 9(a) and FIG. 9(b), and the above-mentioned output is summed up at every blocks, which is processed statistically further to discrimination of the picture image at every blocks. Here, X direction indicates the main scanning direction, and Y direction indicates the subscanning direction.

Figure 11A:
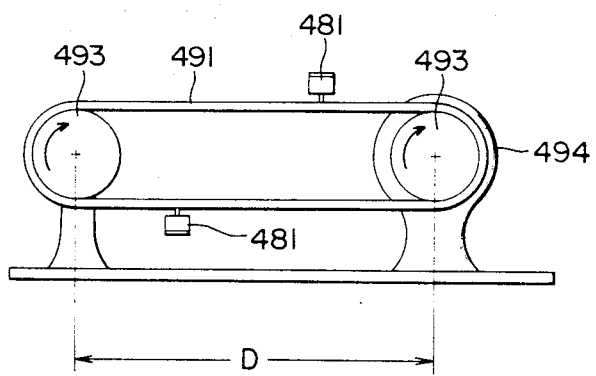
FIG. 11(a) and FIG. 11(b) are side views representing one operative example of a scanning unit relating to this invention which operates parallel scanning of FIG. 9(b)
Figure 11B:
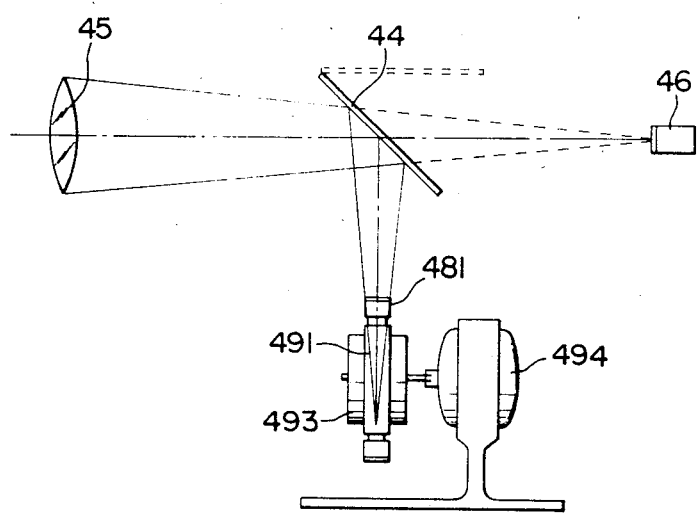

FIG. 10(a) and FIG. 10(b) represent one operative example of a scan driver for the sensor to carry out a zigzag scanning as shown in FIG. 9(a), and FIG. 11(a) and FIG. 11(b) represent one operative example for a parallel scanning shown in FIG. 9(b).

FIG. 10(a) is a plan view of a scan driver of a sensor 371 for picture image discrimination, and FIG. 10(b) is the side view taken in the main scanning direction. The driver is applied on a picture image reader of a document plate traveling type.

The sensor 371 is provided between the pickup lens 35 and the solid state image sensor 36 and fixed on a driving rod 381. A reference numeral 3811 denotes a pulley fixed rotatably on the driving rod 381 and mounted on a bench 382 provided in the main scanning direction. Then, 3812 denotes a pin groove in which a driving pin 392 is capable of sliding freely. A reference numeral 391 denotes a belt on which the driving pin 392 is provided, and 393 denote pulleys to tense the belt 391, and one pulley is coupled to a motor 394 to work as a driving pulley. A shaft interval of the pulleys 393 is taken somewhat wider than a scanning width D, thereby avoiding a sine curve to arise on a scanning line at the point in time of turning of the driving pin 392. Then, when the sensor scanning for collection of the density information ends to come into a pickup process, the sensor 371 is moved outside the scanning width D(document width).

The number of times for scanning can be changed by adjusting a rotational number of the motor 394 and the number of sensors 371 to install. Then, the belt 391 and the pulley 393 can be changed to a sprocket and silent chain.

Next, FIG. 11(a) is a side view of the second operative example of the scan driver (scanning unit) for carrying out a parallel scanning on the sensor which is taken in the main scanning direction, and FIG. 11(b) is a side view taken in the subscanning direction.

In FIG. 11(a) and FIG. 11(b), 44 denotes a mirror provided between the pickup lens 45 and the solid state image sensor 46. Then, 481 denotes at least one sensor with the light receiving face directed outside of a belt 491 laid on a pulley 493 driven by a motor 494 fixed on the belt 491.

When the belt 491 is carried in a constant direction, an arbitrary number of scanning lines can be given to a unit length of the document according to the carrying speed and the number of sensors 481 installed.

The density information of the picture image of document collected on the sensor of the scanning unit shown in FIG. 10(a), FIG. 10(b) and FIG. 11(a), FIG. 11(b) is transmitted to the signal processing division having a sensor signal processing system like that of FIG. 4, and thus a picture image discrimination is performed for the overall document or at every blocks.

An optical information signal So incident on the sensor 46 in the signal processing division is arranged into a density histogram summed up for the overall document or at every picture image blocks divided plurally on the document according to a processing program stored in ROM 475 by CPU 473 by way of a sampling circuit 471 and an A/D converter 472.

Figure 12:
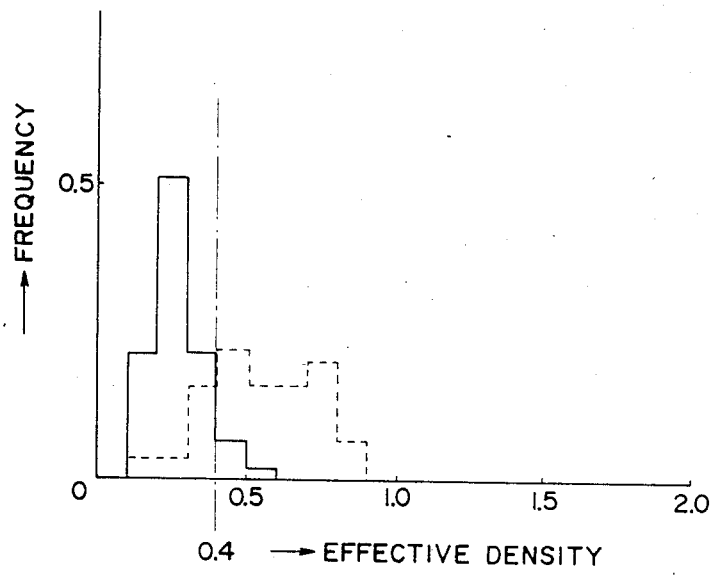
FIG. 12(a) is a histogram of an effective density obtainable according to this invention.
FIG. 12(b) is a drawing giving a relation between cumulative value and discrimination threshold obtained in FIG. 12(a) for discriminating linear picture and tonal picture.
Figure 12:
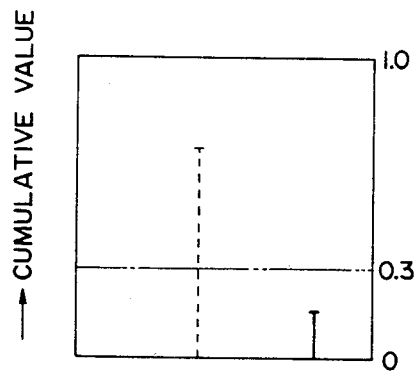

FIG. 12(a) shows an example of the effective density histogram arranged according to the optical information signal So incident on the sensor 46 having its light receiving face provided in the approximate focus domain at the signal processing division.

The histogram indicates a frequency when the quadrature axis is taken with an effective density interval at 0.1 and the axis of ordinates with a total number of sampling at 1.0. Here, the effective density is so called, since an output of the sensor is relative with the picture image density. The histogram given in continuous line is an example of what is obtained through scanning the linear picture, and that in broken line is an example of what is obtained through scanning the total picture.

To discriminate the linear picture and tonal picture from the above-mentioned histogram, a reference value (density threshold) is determined on a density axis (abscissa) from a statistical point of view, first. In the drawing, the density is given at 0.4 and so shown in one-dot chain line. Next, in the domain with higher density or lower density than the density threshold, when a cumulative value of the frequency of linear picture and tonal picture, there arises a difference in the cumulative value according to the linear picture and the tonal picture. A cumulative value in the domain on higher density side from the density threshold (0.4) is given in FIG. 12(b) as one example. Next, a picture image discriminating threshold shown in the two-dot chain line of FIG. 12(b) is determined as a reference for picture image discrimination, a dimension of the cumulative value is compared with reference to the discriminating threshold, and when the cumulative value is greater than that, it can be regarded as a tonal picture, and thus a discriminating signal of the linear picture and the tonal picture can be outputted at every blocks through the above comparison or binary coding.

In case that the effective spot size is set at about 3 $mm^2$ and the reference density for obtaining the cumulative value is set within 0.2-0.6, the threshold of the cumulative value should be set within 0-0.8.

Figure 13:
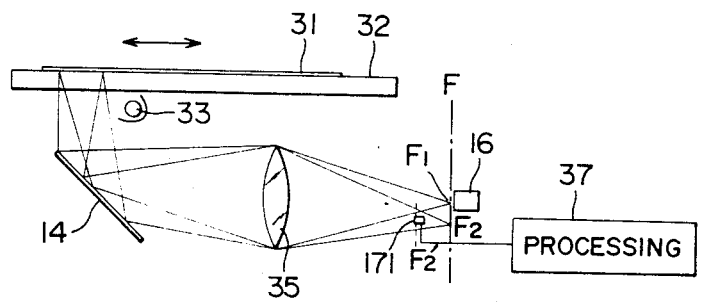
FIG. 13 is a schematic drawing of other operative example of this invention.

In other operative example of this invention, CCD 16 uses a long line image in the main scanning direction, as shown in FIG. 13, and converts the picture image of document at a point $F_1$ on the focus F photoelectrically.

The light receiving face of the sensor 171 is provided within a luminous flux of the picture image given at a point $F_2$ on the focus F and also at a point $F'_2$ (ahead of the focus F, for example, in the drawing) in the approximate focus domain in the neighborhood of the focus F. Here, the approximate focus domain does not include a face coincident perfectly with the focus. A picture element of the picture image of document passes both points $F_2$ and $F_1$ discrepantly in time, therefore there is a fluctuation in the quantity of light received on the light receiving face of the sensor 171 provided at the point $F'_2$ for the ratio of a sectional area of the luminous flux of the picture image on $F_2$ to an area of the light receiving face, however, information covering the whole range for scanning of the picture image of document can be employed.

Figure 14:
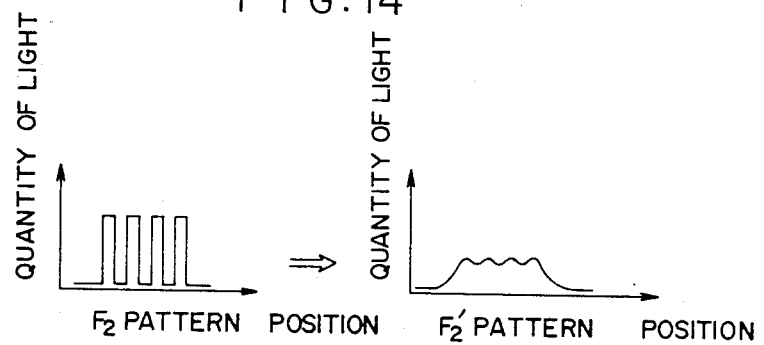
FIG. 14 represents a pattern example of a picture image of document in rectangular wave pulse form at a focus and non-focus domain.

Picture images of document having a rectangular wave pulse image at points $F_2$ and $F'_2$ are shown in FIG. 14. A pattern of the picture image at $F_2$ is clear, therefore an averaging circuit will be necessary for forming a mean output signal corresponding to the average density or the picture image density. On the other hand, the picture image at $F'_2$ is trapezoidal to have a gentle ruggedness on the top, and the height can be used as it is as a mean value. Therefore, the averaging circuit can be omitted.

Then, the light receiving face of the sensor 171 can be provided on an arbitrary face in the approximate focus domain of the focus F (except such position as will interfere irradiation onto CCD 16 for picture image information transmission), therefore an exclusive place for installation is not necessarily to be provided therefor, and an installation precision is not particularly required. Therefore, it is comparatively easy to provide it on an existing recording apparatus additionally.

When the sensor 171 is provided at the point $F_2$ on the focus F, a histogram regarding an output (corresponding to density) of the sensor 171 at a sampling spot to a linear picture and tonal picture becomes same as FIG. 1. Further, when the sensor 171 is placed at the point $F'_2$ in the approximate focus domain, a histogram formed from an $F'_2$ pattern obtained through the sensor 171 becomes same as FIG. 12(a). The axis of oridnates indicates a sample number (frequency) and the abscissa indicates an effective density when the sum of samples is 1. As will be apparent from FIG. 12(a), when obtained through an optical pattern at the point $F'_2$, the peak of the histogram for linear picture deflects sharply to the low density side as compared with that of FIG. 1. On the other hand, the histogram becomes same as FIG. 12(a) in the tonal picture, and the high density side contracts to incline toward the low density side generally but not so severe.

Therefore, in the histogram for effective density of FIG. 12(a), when density 0.4 is specified, for example, as threshold properly as shown in one-dot chain line of the drawing and a cumulative value of frequency at 0.4 or over is specified accordingly, there arises a big difference between the cumulative values of the linear picture and tonal picture as shown in FIG. 12(b). Therefore, from specifying a threshold for discriminating the picture image (called "picture image threshold" hereinafter) at a suitable height in the cumulative value, the tonal picture can be so identified when the cumulative value is higher than the picture image threshold, and the linear picture can be so identified when it is lower. In this case, the density threshold can be changed properly from the density 0.4.

As described, a simplicity of installing the sensor 171 and an omission of the averaging circuit can be attained by providing the light receiving face of the sensor 171 on the approximate focus domain for sampling the optical information signal So, thus facilitating the picture image discrimination with accuracy.

Figure 15:
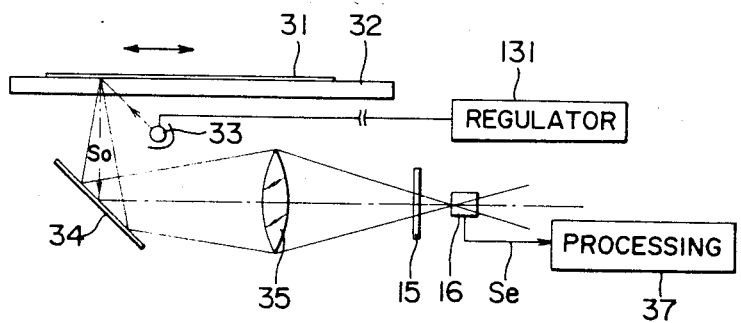
FIG. 15 is a schematic drawing of other operative example of the picture image discriminating apparatus according to this invention.

A schematic drawing of other operative example of the picture image discriminating apparatus according to this invention is given in FIG. 15. In the drawing, 15 denotes a color filter, ambient light correcting filter, gray filter, infrared-ray cut filter, prism or grating which adjusts a wavelength range of the light signal and a luminous intensity distribution in consideration of color conditions and reflection factor of the document 31 or luminous intensity distribution from the light source 13 and light wavelength range or sensitivity of the photoelectric conversion element and sensitivity range; the gray filter is used in the operative example. A plurality of mirrors, filters and lens systems can be used according to an engineering specification of the optical path.

Photoelectric tube, photodiode or phototransistor, semiconductor position sensor or image sensor like CCD, MOS, CID or BBD which receives the light signal So divided into the number of picture elements one- or two-dimensionally and concurrently from the irradiated document section at every elements can be used for the sensor 16.

Then, for the strength of light the sensor 16 receives, a luminous intensity regulator 131 can be provided on a light source 33 other than the above-mentioned filters, thereby adjusting the emitted light itself. Both the two can be used at the same time.

The part from the light source 33 to the filter 15 forms an optical system of this operative example, and that from the light source 33 to a sensor 16 forms a photoelectric conversion division. A signal processing division 37 is constituted from having necessary processing functions combined properly according to how the picture image is discriminated. A document picture discriminating process is carried out by connecting the above photoelectric conversion division and the signal processing division 37.

When equipping a copying apparatus or recording apparatus with the picture image discriminating apparatus, a picture image is exposed onto a photoconductive sensitive member of the copying apparatus or recording apparatus or to an image sensor of CCD or the like, and an optical system to form an electrostatic charge image on the photosensitive member surface can be used partly at least. Of course, an exclusive optical system and photoelectric conversion division can be provided for the document picture discriminating process and pickup process. Then, the pickup and recording processes are not necessarily limited to those which are mentioned above.

Figure 16A:
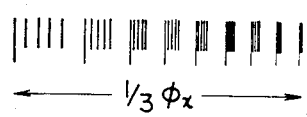
FIG. 16(a) represents a fundamental picture image pattern of a document.

An example of a pattern when a picture signal Se generated at the document picture discriminating process by the sensor 16 is made to work as a density output is shown in FIG. 16(a).

Figure 16B:
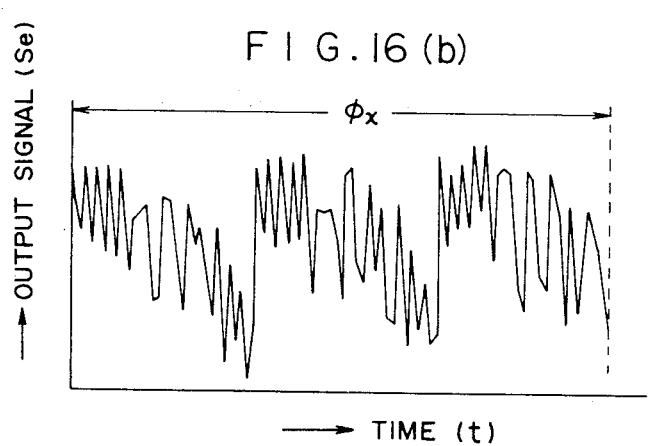
FIG. 16(b) and FIG. 16(c) are diagrams of a density signal obtainable through scanning.

FIG. 16(b) illustrates an output signal of the picture signal Se obtained through scanning Facsimile Test Chart No. 5 the fundamental pattern of which is shown in FIG. 16(a) and which is specified by Picture Image Electronics Society and receiving it on a photoelectric tube at ever unit reading sizes. Test Chart No. 5 comprises repeating a fundamental pattern $\phi x/3$ long of FIG. 16(a), and the picture signal Se is that for which all charts ($\phi x$ long) are scanned. It is shown as a density time series diagram with the signal output Se given on the axis of ordinates and a scanning time t on the abscissa. Then, it is noteworthy that the density output sampled at each scanning point coincides with an average density of the document picture reading section within the unit reading size.

Figure 16C:
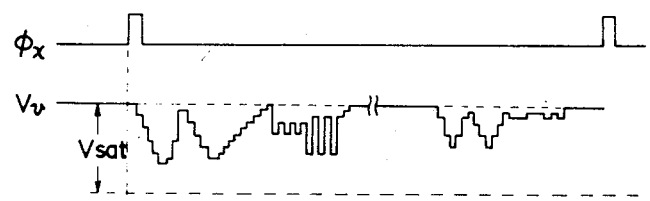

FIG. 16(c) represents an example of the co-ordinate series diagram wherein the picture signal Se of all picture elements obtainable for a general document picture through carrying out subscanning at the same time by means of CCD image sensor for the sensor 16 and arrayed in the main scanning direction is outputted serially. In the drawing, $\phi x$ denotes an exposure time of CCD image sensor or a pulse to control one main scanning time, and Vv denotes an output signal after the light is received with the document picture information accumulated in the subscanning direction in each picture element. Here, Vv has a saturation value Vsat, and hence the quantity of light and exposure time will have to be controlled so as not to exceed the saturation value Vsat.

The time series or co-cordinate series diagram (both called "diagram" collectively hereinafter) is as mentioned above, and for reliability of a result obtained through discriminating the linear picture and tonal picture, a significant difference must be produced, first, between both linear picture and tonal picture in an output signal of the picture signal.

From observing the diagram having scanned the chart minutely in FIG. 16(a), it is understood that the density output deteriorates in accordance as the scanning is shifted to the chart with fine pitch.

The phenomenon is important to be the base for attaining this invention, and in accordance as a pitch of the chart subjected to scanning gets fine, a document ground part becomes much to occupy in the unit reading size, thus generating an effect to deteriorate the density, and this is due to a correlation between a line width in the document and a dimension of the unit reading size, or an extent of the scanning area to sample the light signal. Namely, it is produced by scanning the document picture with the unit reading size enlarged in dimension.

A density-frequency histogram obtainable from the above diagram becomes same as FIG. 2(a), and a histogram of frequency and cumulative value obtained therefrom becomes same as FIG. 2(b).

The above-mentioned phenomenon and processing are effective particularly in the image sensor of CCD or the like, which can be realized by accumulating and outputting a plural main scanning like information while the document and the sensor move relatively.

Namely, it is very useful as a means to differentiate a linear picture from a tonal picture to increase a unit scanning area as in the case wherein a dimension of the unit reading size is increased.

To say concretely, it is to increase the quantity of light accumulated on the sensor, and hence care should be taken to the phenomenon that the quantity of light increases on the sensor as compared with the quantity of light on the sensor when the document picture is scanned at a scanning unit of area as small as possible for taking the document picture effectively for resolution.

However, the relation between the quantity of light on the sensor and output is linear generally in the range of the light being little in quantity, but an increment of the output decreases to the increment in the quantity of light in accordance as the quantity of light received increases, and the relation between the two becomes curve and saturated finally to zero.

Figure 17:
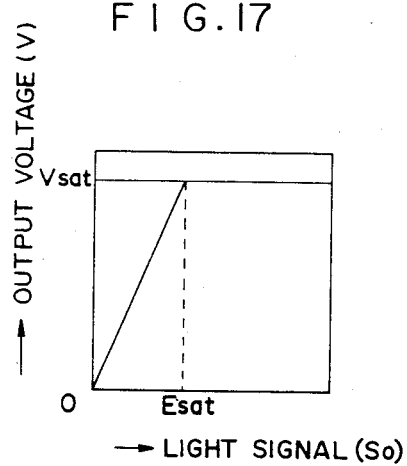
FIG. 17 is a drawing giving a relation between quantity of light received and an output (voltage) at CCD.

FIG. 17 indicates the relation between the quantity of light received on CCD and an output (voltage) to the quantity of light. The axis of ordinates indicates an output voltage V, the abscissa indicates the quantity of light received E, the voltage saturation point Vsat is produced, and a voltage saturation light point Esat to Vsat is indicated. Namely, the output voltage will not increase from increasing the quantity of light received to Esat or over, and a significance as the signal is thus lost.

In the invention, the quantity of light received at each picture element of the sensor is accumulated, which works as a picture signal output, therefore the picture signal output voltage must be retained at the voltage saturation point Vsat or below at CCD by adjusting a luminous intensity of the light signal So properly.

For the means to adjust a luminous intensity of the light signal So, a necessary number of filters, prisms or gratings will be inserted in the optical system as mentioned hereinabove, or a luminous intensity regulator like transformer will be provided on the light source. To use the above means at the same time is also effective.

In FIG. 15, a halogen lamp (rated at 100 V) is used for the light source 33, which is lighted up at 80 volts, a neutral density filter 0.7 in density of Kodak Latten ND Filter No. 96 (manufactured by Eastman Kodak) is used for the filter 15, and the CCD image sensor is used for the sensor 16. The signal processing division to process picture signals from CCD obtained as above is constituted so as to prepare a density-frequency histogram and then a frequency accumulated histogram according to the above-mentioned picture signal and obtain a picture image discriminating output. The block diagram is given in FIG. 18.

A reference numeral 51 denotes a photoelectric conversion division which includes CCD, and the light signal So is subjected to photoelectric conversion into a picture signal Se. Then, 52 denotes a sampling circuit, and 53 denotes a switch to transfer and distribute Se sampled as above to an ensuing analog shift register 54. The analog shift register 54 can be provided in any selected number according to a scanning specification for the document picture. A reference numeral 55 denotes an A/D converter to sum up Se and subject it to A/D conversion, 56 denotes a central processing unit (CPU) such as microprocessor or the like which operates for arithmetic operation of data statistics, conversion, etc. and decision, 57 denotes a memory (ROM) to store operation of CPU 56 and other programs, 58 denotes a memory (RAM) to collect and store data from CPU 56 and supply further to CPU 56. Then, 59 denotes a timing control division to control a light receiving time of CCD 51 and generate a clock signal for determining operation timing of the sampling circuit 52, the switch 53, and the analog shift register 54, and a controlling clock signal for determining a timing of arithmetic operation, data sending or calling of CPU 56.

In the above operative example, the luminous intensity is controlled to about 1/5 by the neutral density filter, a reading time in the subscanning direction is increased to enlarge an effective reading size, and thus a picture image discrimination stable at all times, high in precision and also high in reliability can be effected.

Figure 19:
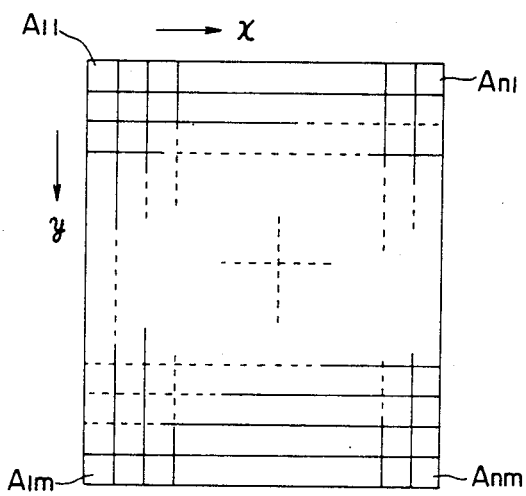
FIG. 19 is a drawing representing a feature of the invention with a unit reading size face outputting a picture signal arrayed on a document in model.

Next, an example that the situation in which a scan reading domain of a feature of this invention is enlarged is arrayed in simulation on the document surface is illustrated in FIG. 19.

With Aij having the document divided into n in the main scanning direction (x direction) and into m in the subscanning direction (y direction) as one unit, the reading domain outputs a picture signal at every Aij. Here, for the picture element width (one unit reading width) in the main scanning direction, one unit of the reading width can be constituted of one picture element of CCD image sensor or a plural picture element. For one unit of the reading width in the subscanning direction, an optimal width must be found according to a difference in kind of the document or recording system, and the width can be adjusted by changing a main scanning period.

The invention is that of increasing the light signal incident per picture element of the sensor effectively by enlarging the unit scanning domain (reading face) to obtain an output of the picture signal on the document surface which corresponds to the unit reading size of scanning and reading the picture image of document, i.e. prolonging the main scanning period as a relative speed of the document in the subscanning direction and the sensor left as it is, thereby facilitating a discrimination of the linear picture from the tonal picture. A density histogram obtained practically on the picture image discriminating apparatus of this invention through a picture signal is shown in FIG. 20(a) and FIG. 20(b).

Figure 20:
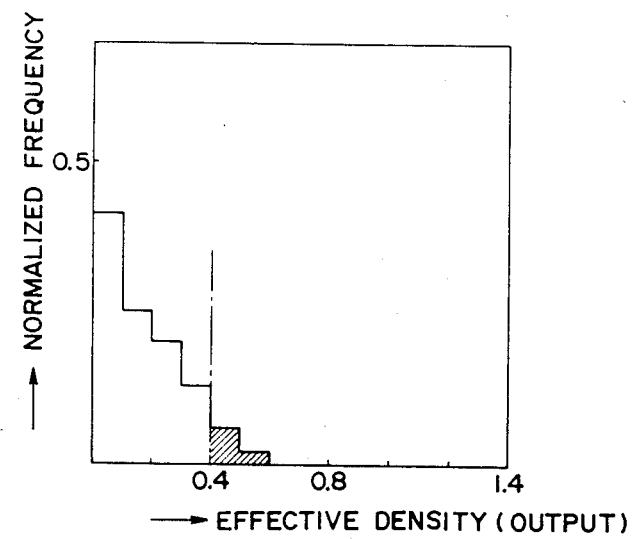
FIG. 20(a), FIG. 20(b) and FIG. 20(c) are density histograms obtained on the picture image discriminating apparatus according to this invention and histogram for discrimination according thereto.

FIG. 20(a) and FIG. 20(b) are density histograms obtained through scanning a linear picture document and a tonal picture document respectively, and FIG. 20(c) is a histogram consisting of cumulative values obtained in the same way as the picture image discriminating method described in FIG. 1, showing a difference between linear picture and tonal picture distinctly.

Therefore, an arithmetic operation to compare data of this histogram with the discriminating threshold (0.3 for example) is carried out at the signal processing division, thus obtaining a discrimination output.

In case a copying equipment or the like is equipped with the picture image discriminating apparatus of this invention to which the consideration described above is given, a picture image discriminating result stored and collected in the memory (RAM) of the picture image discriminating apparatus is put in the control division of a copying process of the copying equipment for use on setting conditions of at least one process of those pickup process, picture image manipulating process, coding and storing process or picture image recording process of the copying process to improvement of the picture quality, and is further available for use on the optical system or the photoelectric conversion division at the same time according to a constitutional mechanism of the pickup process and the picture image recording process of the copying process, CPU, RAM or ROM which is used for the document picture discriminating process can be incorporated then in the control division of the copying process by expanding function somewhat, thereby working together with those copying processes. The picture image density output is obtainable as a time series output according to the quantity of light from a given unit section through scanning the document on a solid state image sensor (image sensor of CCD or the like).

In the meantime, a discriminating method capable of extracting emphatically the difference between linear picture and tonal picture is necessary to discriminate the picture image. When the linear picture consisting of a fine line like character is read and applied at every constant-sized sections, the width of a unit section to read (unit picture image reading size) being near the width of one fine line with reference to the directions of main scanning and subscanning is available for obtaining a picture image density output corresponding to the fine line density and the document ground density.

In this case, a contribution of the ground portion covering the unit reading size gets large in accordance as the width of unit reading size is enlarged, an effective density deteriorates, a frequency that a maximum value (peak) appears in the time series picture image output signal in one picture element of the solid state image sensor decreases consequently, and this tendency becomes conspicuous with the document having much exposed portion of the ground in the picture image. The frequency wherein the picture image output signal is low in output gets large consequently.

On the other hand, in the linear picture image, the tendency of increase in the low output reading frequency mentioned above decreases, as a contribution of the ground portion decreases in accordance as the line width of the linear picture gets large. Then, the tonal picture corresponds as a limit of the tendency that the line width gets large, and in an output signal of the tonal picture, the low output decreases and the high output reading frequency gets large.

Therefore, it is useful to enlarge the width of a unit picture image reading size (called "unit section" hereinafter) for reading to a constant value or over as a means to distribute the linear picture and the tonal picture.

On the other hand, when the minimum reading width of a solid state image sensor is "a", the picture element of the width "a" becomes a unit, or a width of the unit section, therefore an output level with high frequency will come to increase or decrease in the series output signal of linear picture or tonal picture according to a change of the width "a".

Generally, a solid state image sensor for picture signal reading, taking and recording is adjusted with the optical system and so arranged as to read the finest line of the document thoroughly, therefore when the solid state image sensor is used in common with the picture image discrimination, a distribution (frequency) of the output level due to a difference between the linear picture having the finest line and the tonal picture comes to indicate a definite difference from specifying the distance double the minimum reading width "a" in the subscanning direction with reference to the one picture element and also the area corresponding to two adjacent picture elements in the main scanning direction (or direction in which the solid state image sensor is arrayed) as unit section for reading. Even the same linear picture will have a difference according to the kind of document, therefore it is necessary to specify an area $4a^2$ or over as the unit section for reading.

Figure 21A:
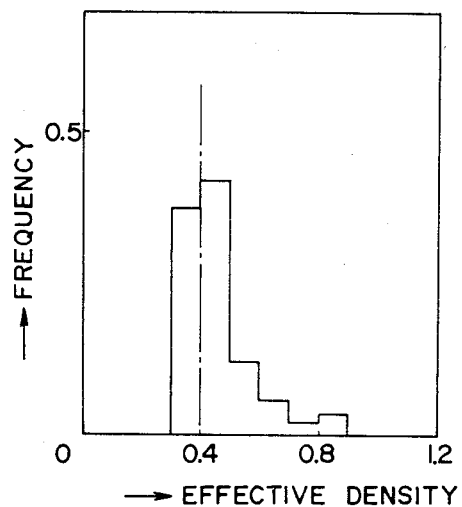
FIG. 21(a) and FIG. 21(b) are histograms obtainable when other operative example of this invention is used.
Figure 21B:
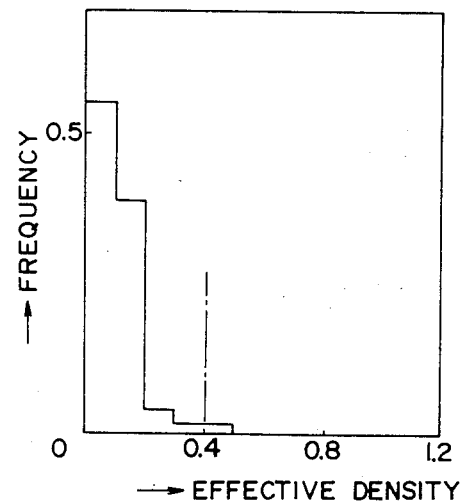
Figure 21C:
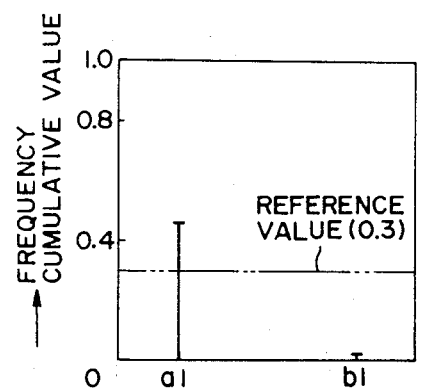
FIG. 21(c) gives an example of histogram used for binary discrimination obtainable from the above histograms.

FIG. 21(a), FIG. 21(b) and FIG. 21(c) illustrate a result obtained on a picture image discriminating apparatus to obtain a discrimination output by means of a deflection due to a difference between linear picture and tonal picture of a density frequency histogram of the picture image density output.

In the operative example of the drawings, the minimum readable width "a" (reading density) of the solid state image sensor is 8 dots/mm both in the main scanning and subscanning directions, the picture image is read with the reading size (unit section) as a face 1 mm in both scanning directions, thereby obtaining a density frequency histogram. FIG. 21(a) represents a histogram obtained from the tonal picture, and FIG. 21(b) represents a histogram obtained from the tonal picture, and FIG. 21(b) represents that from the linear picture. An apparent deflection is observed from comparing both the drawings, and a boundary for discrimination of the tonal picture from the linear picture is determined as a density threshold according to use, recording system, etc. In both the drawings, a density 0.4 indicated by a one-dot chain line is specified as the density threshold.

Next, the case wherein a cumulative value of the normalized density in a density zone greater than the threshold (0.4) is made into a frequency cumulative graph is shown in FIG. 21(c). In FIG. 21(c), a1 is an example obtained from the tonal picture, and b1 is a cumulative value of the example obtained from the linear picture. As will be apparent from the drawing, the heights of histograms of the tonal picture and linear picture belong to a numerical aggregation apart with each other, an intermediate numeric value which does not belong to both aggregations is taken as a reference value (discriminating threshold), and from its being higher or lower than the discriminating threshold, the tonal picture can be discriminated from the linear picture. In the operative example, the discriminating threshold is given at 0.3. Then in the case of hybrid picture, the document is divided into a plurality of blocks to discrimination each, thereby obtaining a binary-coded discriminating signal at every blocks.

As described above, a picture image discriminating apparatus capable of discriminating definitely according to the difference in time series picture image output and density frequency histogram which are shown by linear picture and tonal picture is obtained by specifying a reading unit section of the document at $4a^2$ or over with the minimum reading width "a" of the solid state image sensor working as a reference therefor, an improvement of picture quality and a quality compression effect at compression store of the picture image are thus obtainable, and further a better efficiency will result from storing a picture image discriminating result for a necessary period of time.

Then, in the majority of cases where the document is read on a solid state image sensor irrespective of picture signal input or picture image discrimination, a one-dimensional line image sensor is scanned to the document, however, the image sensor is moved to scan with the document fixed or the document is moved to scan reversely with the image sensor fixed, and a drive of the image sensor or a speed to transmit the light signal irradiated onto a picture element constituting the image sensor are set according to a required picture quality of record or copy, recording speed, etc. Therefore, an input time of the light signal per picture element is determined, and particularly for applying the picture signal, one main scanning must be completed quickly to a better resolution, and the number of subscanning times must be increased as many as possible.

In other operative example of the picture image discriminating apparatus according to this invention, the image sensor can be used together with an image sensor for applying the picture signal, and, in such case, a reference timing clock necessary for drive (including transmission) of the image sensor is left unchanged as at the time of picture signal input, but a scanning speed in the subscanning direction is increased, and thus the light signal in the picture image of document inputted to one picture element of the image sensor does not make an appreciable change in the quantity of light as a whole, but since a scanning distance per unit time in the subscanning direction is made longer, the light information comes to have a picture element information to be applied one time accumulated accordingly. The above status is just the same as that in which a big picture image reading size has been obtained, therefore an exceedingly good effect is brought for picture image discrimination.

In this operative example of this invention, the above-mentioned image sensor operates with a slender picture element on the surface of document having a picture image width measured in the main scanning direction of the document corresponding to the picture element width in the line direction of, for example, CCD line image sensor (called "CCD" hereinafter) and a scanning width determined by the subscanning speed in the subscanning direction as a scanning unit (unit picture image reading size), and converts the light signal So into the picture signal Se at the scanning units.

The light signal So to each picture element of CCD is converted into voltage photoelectrically according to a quantity of light E incident at every elements of each CCD, or the product of an intensity of light I incident and an incident time t, which works as the picture signal at each picture element. A response of the quantity of light E of the light signal So and the picture signal Se (voltage V) is same as FIG. 17. Then, the incident time t of a reflection from the document at each picture element is equal to the time in which the scanning unit is subscanned.

As illustrated, in a curve of the quantity of light incident at each picture element of CCD vs. the output voltage, there exists the upper bound Esat of the quantity of light E corresponding to the saturation point Vsat. For the picture signal Se to be significant, therefore, an adjustment must be made so that the light received on each picture element of CCD will not reach the upper bound Esat covering full scanning zone of the document. It is then transmitted to a signal processing means, or analog shift register, for example.

Figure 22:
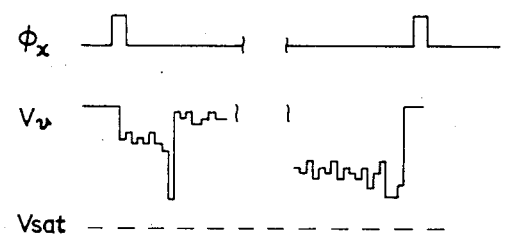
FIG. 22 is a coordinate series diagram of an image sensor output.

In FIG. 22, Vv denotes an output signal from CCD, $\phi x$ denotes a pulse to specify start or end of one main scanning of CCD, and $\phi x$ pulse duration implies the picture signal Se for one main scanning. The broken line indicates a level of the saturation point Vsat at one picture element of CCD. Therefore, Vv in the coordinate series diagram (simply called "diagram" hereinafter) of FIG. 22 indicates a time series signal output on density.

In the meantime, the length (time width) in the subscanning direction of the scanning unit which forms one scanning signal Vv can be determined arbitrarily by controlling the subscanning speed which is a relative speed of CCD with the document. Then, a diagram in which a constant and a plural one scanning output signal group Vv is lumped together and added and averaged in the subscanning direction at every picture elements in a line direction of CCD can be formed. Further, the one scanning output signal Vv is divided in the main scanning direction and can be put in order at each division. The document can be divided into a plurality of blocks by combining it with a disposal to lump together in the subscanning direction.

Where a time series signal output (diagram) of the picture signal Se is thus obtained, various methods for picture image discrimination will be conceivable by a statistical signal processing, and thus various types of picture image discriminating apparatuses can be contrived in this invention.

For example, another histogram on density frequency, peak interval frequency or maximum value number frequency will be developed from the above diagram, and in the histogram, density, peak interval or maximum value number is distributed with reference to a threshold (specific value) to a change of picture image (picture quality), frequencies are accumulated in the range greater or smaller than the threshold, the frequency cumulative value thus obtained is then compared with a reference value (discriminating threshold) statistically obtained separately, thereby discriminating whether the picture image is a linear picture or tonal picture.

One operative example of the picture image discriminating apparatus of this invention is given in another method for picture image discrimination by means of a density frequency histogram.

Figure 3:
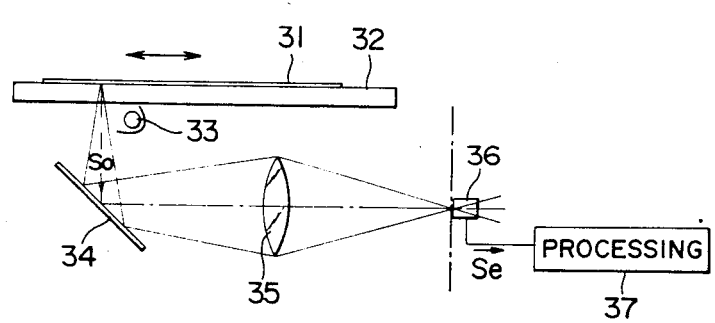
FIG. 3 is a schematic drawing of the apparatus according to this invention.

CCD is used for the image sensor, a constitution of the photoelectric conversion division including CCD is as shown in FIG. 3 and further a constitution of the signal processing division to process a picture signal output from CCD is as shown in FIG. 18.

Figure 23A:
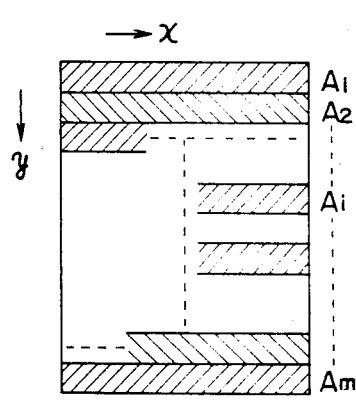
FIG. 23(a) and FIG. 23(b) are explanatory drawings of a scanning unit.

When the peak interval frequency is obtained from the time series picture signal output to picture image discrimination, the width of the scanning unit in the subscanning direction (y direction in the drawing) is determined by controlling the subscanning speed as shown in FIG. 23(a), and from setting the scanning domain in the subscanning direction on a clock from the sampling circuit 52 and the timing control division 59, the scanning portion is identified with a portion Ai (i=1, 2, ..., m) in oblique lines in FIG. 23(a). The picture signal diagram at each Ai is obtained in a status similar to FIG. 3, the diagram is processed to obtain peak interval and frequency of the number of times of peak.

Next, a density frequency histogram (simply called "histogram" hereinafter) with density 0.1 as a unit is obtainable from the diagram obtained as above which covers the main scanning line zone like that of FIG. 23. A normalized frequency is taken on the axis of ordinates.

The histogram obtained through scanning Facsimile Test Chart No. 2 specified by Picture Image Electronics Society as an example of the linear picture becomes similar to FIG. 20(a), and the histogram obtainable from a human bust as an example of the tonal picture becomes similar to FIG. 20(b).

As will be apparent from comparing FIG. 20(a) and FIG. 20(b), the histograms of linear picture and tonal picture have a definite deflection, and 0.4 density line can be specified as a specific value. It is shown in one-dot chain line in the drawing. A difference in the picture image can further be discriminated precisely by preparing a histogram from accumulating density frequencies of linear picture and tonal picture in the range (right side of the drawing) greater in density, for example, than the density threshold 0.4 as shown in FIG. 20(c). In FIG. 20(c), the axis of ordinates indicates a cumulative value of the normalized frequency, and histograms (a) and (b) are those of having been obtained from the linear picture of FIG. 20(a) and the tonal picture of FIG. 20(b).

A similar histogram will be obtained for linear pictures and tonal pictures, and from using a normalized density 0.3 indicated by two-dot chain line like FIG. 20(c) as the discriminating threshold (reference value) to discriminate the linear picture and tonal picture, the tonal picture is so decided where the histogram is higher than 0.3, and the linear picture is so decided where the histogram is lower.

The picture image can be discriminated similarly through obtaining a cumulative histogram for the range smaller in density than the above-mentioned density threshold.

Figure 23B:
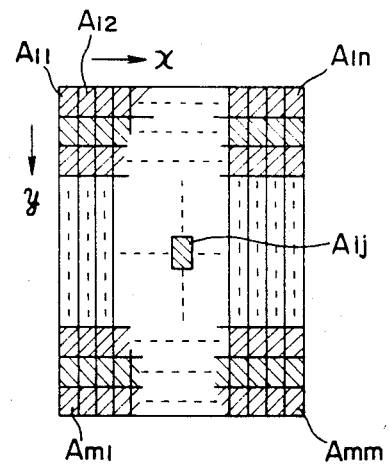

As another method for picture image discrimination, the main scanning direction (x direction in the drawing) of the document is divided, as shown in FIG. 23(b), at each single picture element or plural picture element of CCD, and one picture signal is outputted with each divided section $A_{ij}$ (i=1, 2, ..., m; j=1, 2, ..., n) as unit reading size. The reading time in the subscanning direction is adjusted by changing the scanning speed, and thus the unit picture image reading size optimal to picture image discrimination is obtainable.

A plurality of the above-mentioned divided sections $A_{ij}$ are arranged into one block, and the picture image can be discriminated at the one block, moreover in the case of a hybrid picture in which both linear and tonal pictures are mixed, arrangement and ratio of how both the picture images are mixed can also be grasped, which may lead to a quality picture image discrimination.

In this operative example of the invention, it is also effective to discriminate picture images by means of a peak interval frequency or maximum value number frequency instead of the density frequency.

What is claimed is:

1. A picture image discriminating apparatus comprising means for scanning a picture image of a document, means for converting photoelectrically a light signal corresponding to a density of the picture image obtained by the scanning means into a picture image signal, means for reading the picture image signal at every unit and reading sizes of 0.01 square mm or over, and means for discriminating the picture image by using the picture image signal read, wherein the density signal of the picture image of the document is processed to obtain an effective density histogram, and a cumulative value of the density signals over or below a specific density threshold is obtained in said histogram, thereby discriminating the picture image.

2. The picture image discriminating apparatus as defined in claim 1, wherein said document is divided into a plurality of blocks, and the density signal of the picture image of said document is processed at every block, thereby discriminating picture images.

3. The picture image discriminating apparatus as defined in claim 1, wherein said density signal of the picture image of said document is processed to obtain an effective density histogram, and a cumulative value of the density signals over or below a specific density threshold is obtained in said histogram, thereby discriminating picture images.

4. The picture image discriminating apparatus as defined in claim 2, wherein said density signal of the picture image of said document is processed to obtain an effective density histogram, and a cumulative value of the density signals over or below a specific density threshold is obtained in said histogram, thereby discriminating picture images.

5. A picture image discriminating apparatus comprising a scanning unit to scan a picture image of a document in the subscanning direction, means for converting photoelectrically a light signal corresponding to a density of the picture image obtained by the scanning unit into a picture image signal, means for moving in the main scanning direction the photoelectric conversion means according to the movement of the scanning unit, and means for discriminating the picture image by using the electrically converting picture image signal, wherein the density signal of the picture image of the document is processed to obtain an effective density histogram, and a cumulative value of the density signals over or below a specific density threshold is obtained in said histogram, thereby discriminating the picture image.

6. The picture image discriminating apparatus as defined in claim 5, wherein an effective density histogram is made out according to a signal from the photoelectric conversion means, a cumulative value of a domain over or below a constant density threshold of said density histogram is binary-coded with reference to a picture image discriminating threshold specified statistically, and processing is carried out so as to obtain the binary-coded signal.

7. A picture image discriminating apparatus comprising means for scanning a picture image of a document, a pickup lens through which a light signal corresponding to a density of the picture image obtained by the scanning means is incident, means for converting photoelectrically the light signal passing through the pickup lens into a picture image signal, and means for discriminating the picture image by using the electrically converted picture image signal, wherein a light receiving face of the photoelectric conversion means is provided in a focus at which the document is imaged through the pickup lens, wherein the density signal of the picture image of the document is processed to obtain an effective density histogram, and a cumulative value of the density signals over or below a specific density threshold is obtained in said histogram, thereby discriminating the picture image.

8. The picture image discriminating apparatus as defined in claim 7, wherein an effective density histogram is made out according to a signal from the photoelectric conversion means, a cumulative value of a domain over or below a constant density threshold of said density histogram is binary-coded with reference to a picture image discriminating threshold specified statistically, and processing is carried out so as to obtain the binary-coded signal.

9. A picture image discriminating apparatus comprising means for scanning a picture image of a document, an element for converting photoelectrically the light signal corresponding to a density of the picture image obtained by the scanning means into a picture image signal, means for adjusting an output timing of the picture image signal at every main scanning line of the photoelectric conversion element, and means for discriminating the picture image by processing the electrically converted picture image signal, wherein the light signal is accumulated in a picture element of the photoelectric conversion element by the adjusting means, wherein the density signal of the picture image of the document is processed to obtain an effective density histogram, and a cumulative value of the density signals over or below a specific density threshold is obtained in said histogram, thereby discriminating the picture image.

10. A picture image discriminating apparatus comprising means for scanning a picture image of a document, a solid state image sensing element for converting a light signal corresponding to a density of the picture image obtained by the scanning means into a picture image signal, means for obtaining the picture image signal at every unit picture image reading sizes having a domain square of $4a^2$ or over when a minimum reading width of the image sensing element is given as "a", and means for discriminating the picture image by using the picture image signal at every unit picture image reading sizes, wherein the density signal of the picture image of the document is processed to obtain an effective density histogram, and a cumulative value of the density signals over or below a specific density threshold is obtained in said histogram, thereby discriminating the picture image.

11. The picture image discriminating apparatus as defined in claim 10, wherein a picture signal transmitted to said means for discriminating the picture image is subjected to sampling, and a frequency cumulative value of the picture signal output in any range distributed with reference to a constant threshold of the picture signal is compared with a discrimination reference value obtained statistically, thereby discriminating picture images of the document.

12. A picture image discriminating apparatus comprising a solid state image sensing element for scanning a document and converting a light signal corresponding to a density of a picture image of the document into a picture image signal, means for varying a scanning speed of the image sensing element with respect to the document, and means for discriminating the picture image by using the picture image signal from the image sensing element, wherein an irradiation of the light signal per unit time to each picture element of the image sensing element is controlled by the varying means, wherein the density signal of the picture image of the document is processed to obtain an effective density histogram, and a cumulative value of the density signals over or below a specific density threshold is obtained in said histogram, thereby discriminating the picture image.

* * * * *